United States Patent
Shigeta (10) Patent No.: US 11,356,653 B2
(45) Date of Patent: Jun. 7, 2022

(54) DISPLAY DEVICE, DISPLAY METHOD, AND COMPUTER PROGRAM

(71) Applicant: Sony Corporation, Tokyo (JP)

(72) Inventor: Yu Shigeta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/969,563

(22) PCT Filed: Dec. 17, 2018

(86) PCT No.: PCT/JP2018/046413
§ 371 (c)(1),
(2) Date: Aug. 13, 2020

(87) PCT Pub. No.: WO2019/163272
PCT Pub. Date: Aug. 29, 2019

(65) Prior Publication Data
US 2021/0058610 A1   Feb. 25, 2021

(30) Foreign Application Priority Data

Feb. 23, 2018 (JP) .............................. JP2018-031102

(51) Int. Cl.
*H04N 13/359* (2018.01)
*H04N 13/368* (2018.01)
(Continued)

(52) U.S. Cl.
CPC ......... *H04N 13/359* (2018.05); *H04N 13/133* (2018.05); *H04N 13/302* (2018.05);
(Continued)

(58) Field of Classification Search
USPC .......................................................... 348/51
See application file for complete search history.

(56) References Cited

U.S. PATENT DOCUMENTS

2008/0278805 A1* 11/2008 Schwerdtner ........ H04N 13/302
359/463
2013/0147931 A1* 6/2013 Ohba ................... H04N 13/366
348/54
(Continued)

FOREIGN PATENT DOCUMENTS

JP    09-168170 A    6/1997
JP    10-042315 A    2/1998
(Continued)

OTHER PUBLICATIONS

International Search Report and Written Opinion dated Mar. 5, 2019 for PCT/JP2018/046413 filed on Dec. 17, 2018, 10 pages including English Translation of the International Search Report.

*Primary Examiner* — Mikhail Itskovich
(74) *Attorney, Agent, or Firm* — Xsensus, LLP (57) ABSTRACT

A display device capable of automatically switching display of a stereoscopic image and a display of a planar image according to a detected situation of a user is provided.
Provided is the display device including a display unit capable of displaying a planar image and a stereoscopic image, and a control unit configured to automatically switch an image to be displayed on the display unit to the planar image or the stereoscopic image, using a detected state of the user.

7 Claims, 11 Drawing Sheets

(51) Int. Cl.
  *H04N 13/383* (2018.01)
  *H04N 13/302* (2018.01)
  *H04N 13/133* (2018.01)
  *H04N 13/398* (2018.01)

(52) U.S. Cl.
  CPC ......... *H04N 13/368* (2018.05); *H04N 13/383* (2018.05); *H04N 13/398* (2018.05)

(56) References Cited

U.S. PATENT DOCUMENTS

2014/0002620 A1* 1/2014 Murakami ........... H04N 13/366
  348/51
2014/0028670 A1  1/2014 Tsurumi et al.
2016/0050406 A1* 2/2016 Park ...................... G02B 30/40
  348/49

FOREIGN PATENT DOCUMENTS

| | | |
|---|---|---|
| JP | 2007-044244 A | 2/2007 |
| JP | 2012-039469 A | 2/2012 |
| JP | 2012-191483 A | 10/2012 |
| JP | 2012-227752 A | 11/2012 |
| JP | 2012-245265 A | 12/2012 |
| JP | 2013-008001 A | 1/2013 |

* cited by examiner

DISPLAY DEVICE, DISPLAY METHOD, AND COMPUTER PROGRAM

CROSS-REFERENCE TO RELATED APPLICATIONS

The present application is based on PCT filing PCT/JP2018/046413, filed Dec. 17, 2018, which claims priority to JP 2018-031102, filed Feb. 23, 2018, the entire contents of each are incorporated herein by reference.

TECHNICAL FIELD

The present disclosure relates to a display device, a display method, and a computer program.

BACKGROUND ART

As a method of displaying a stereoscopic image, a naked eye method is known, which enables stereoscopic vision with naked eyes without using special glasses for stereoscopic vision. Representative examples of the naked eye method include a parallax barrier method and a lenticular method. In the case of the parallax barrier method or the lenticular method, a parallax image for stereoscopic vision (a parallax image for the right eye and a parallax image for the left eye in the case of two viewpoints) is displayed on a two-dimensional display panel in a spatially divided manner. The parallax image is parallax-separated in a horizontal direction by a parallax separation unit to realize stereoscopic vision. At this time, in the parallax barrier method, a parallax barrier provided with a slit-shaped opening is used as the parallax separation unit. In the lenticular method, a lenticular lens in which a plurality of cylindrical divided lenses is arranged in parallel is used as the parallax separation unit. As a technique of a display device employing the naked eye method, there is, for example, Patent Document 1.

CITATION LIST

Patent Document

Patent Document 1: Japanese Patent Application Laid-Open No. 2013-8001

SUMMARY OF THE INVENTION

Problems to be Solved by the Invention

Conventionally, in a stereoscopic image display device based on a naked eye method using a parallax between both eyes, switching between a stereoscopic image (3D image) and a planar image (2D image) has been controlled by a user himself/herself.

Therefore, the present disclosure proposes a new and improved display device, display method, and computer program capable of automatically switching display of a stereoscopic image and display of a planar image according to a situation of a user.

Solutions to Problems

According to the present disclosure, provided is a display device including a display unit capable of displaying a planar image and a stereoscopic image, and a control unit configured to automatically switch an image to be displayed on the display unit to the planar image or the stereoscopic image, using a detected state of a user.

Furthermore, according to the present disclosure, provided is a display control method including, by a processor, automatically switching an image to be displayed on a display unit to a planar image or a stereoscopic image, using a detected state of a user, the display unit being capable of displaying the planar image and the stereoscopic image.

Furthermore, according to the present disclosure, provided is a computer program for causing a computer to execute automatically switching an image to be displayed on a display unit to a planar image or a stereoscopic image, using a detected state of a user, the display unit being capable of displaying the planar image and the stereoscopic image.

Effects of the Invention

As described above, according to the present disclosure, a new and improved display device, display method, and computer program capable of automatically switching display of a stereoscopic image and display of a planar image according to a situation of a user can be provided.

Note that the above-described effect is not necessarily limited, and any of effects described in the present specification or another effect that can be grasped from the present specification may be exerted in addition to or in place of the above-described effect.

MODE FOR CARRYING OUT THE INVENTION

Favorable embodiments of the present disclosure will be described in detail below with reference to the accompanying drawings. Note that, in the present specification and the drawings, redundant description of constituent elements having substantially the same functional configurations is omitted by giving the same reference numerals.

Note that the description will be given in the following order.
1. Embodiment of Present Disclosure
1.1. Appearance Example of Display Device
1.2. Configuration Example of Display Device
1.3. Operation Example of Display Device
2. Conclusion

1. Embodiment of Present Disclosure

1.1. Appearance Example of Display Device

First, an appearance example of a display device according to an embodiment of the present disclosure will be described. FIGS. 1 to 6 are explanatory views illustrating an appearance example of a display device according to an embodiment of the present disclosure.

Figure 1:
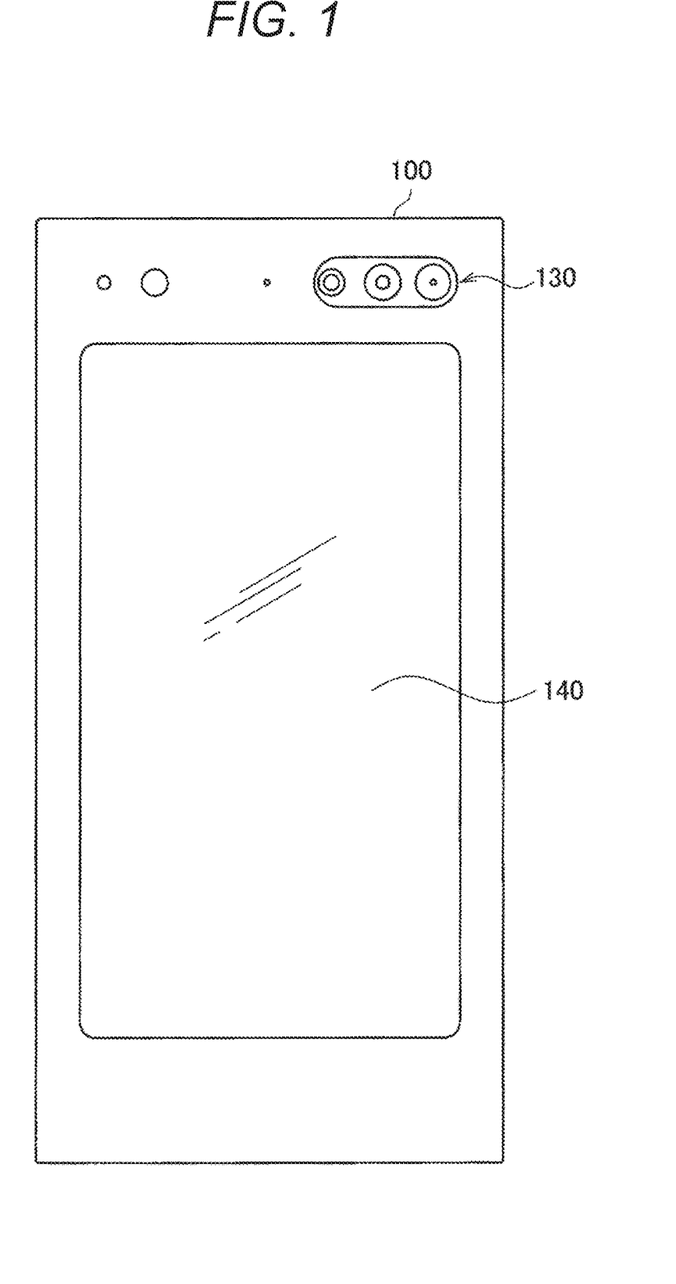
FIG. 1 is an explanatory view illustrating an appearance example of a display device according to an embodiment of the present disclosure.
Figure 2:
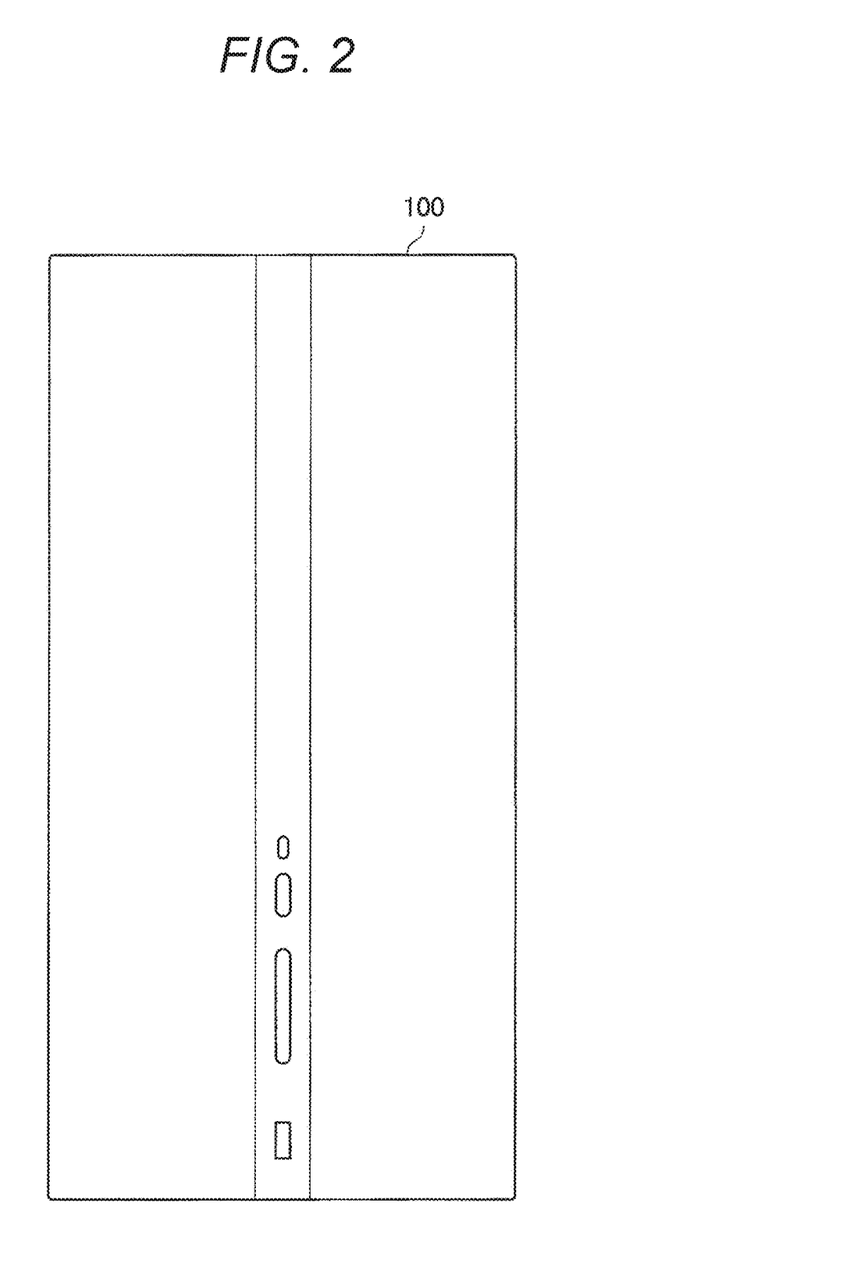
FIG. 2 is an explanatory view illustrating an appearance example of the display device according to the embodiment.
Figure 3:
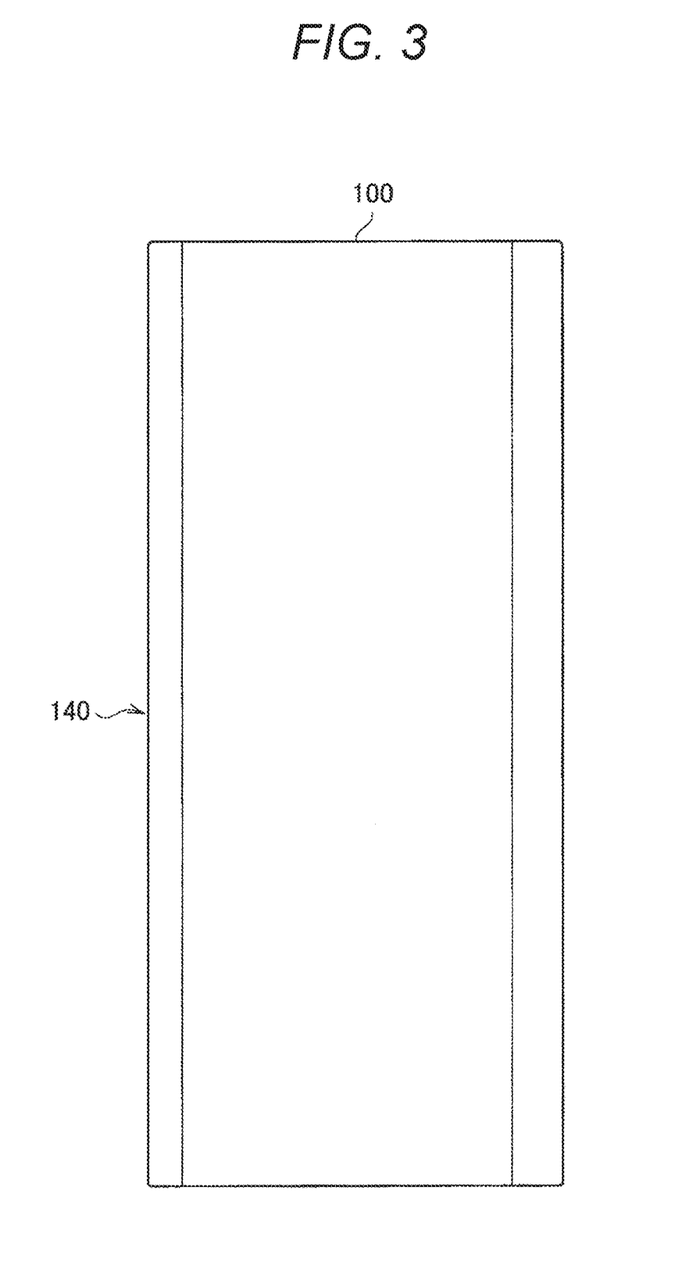
FIG. 3 is an explanatory view illustrating an appearance example of the display device according to the embodiment.
Figure 4:
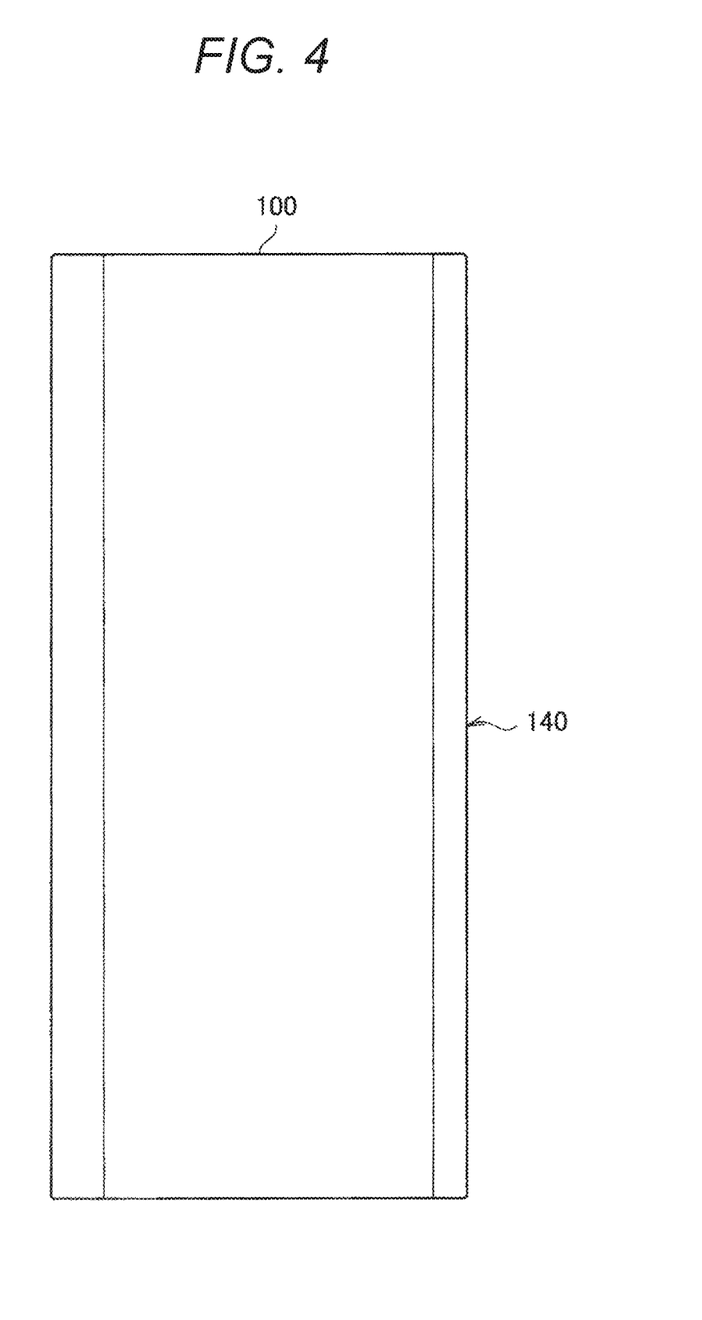
FIG. 4 is an explanatory view illustrating an appearance example of the display device according to the embodiment.
Figure 5:
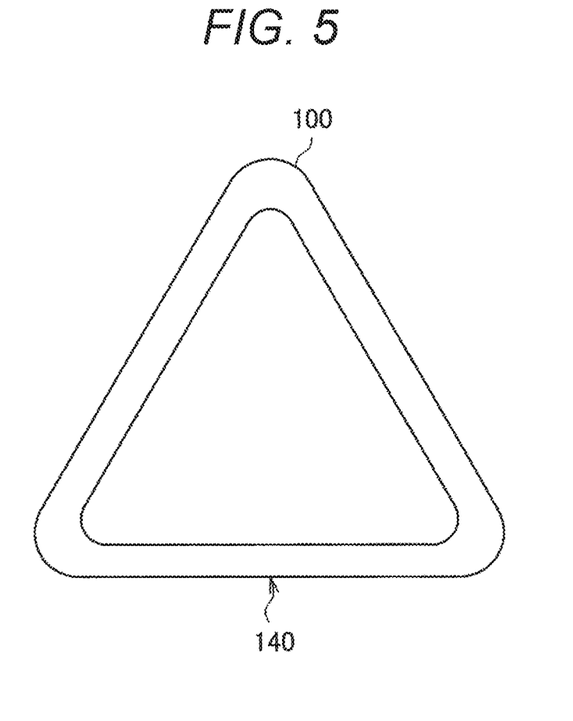
FIG. 5 is an explanatory view illustrating an appearance example of the display device according to the embodiment.
Figure 6:
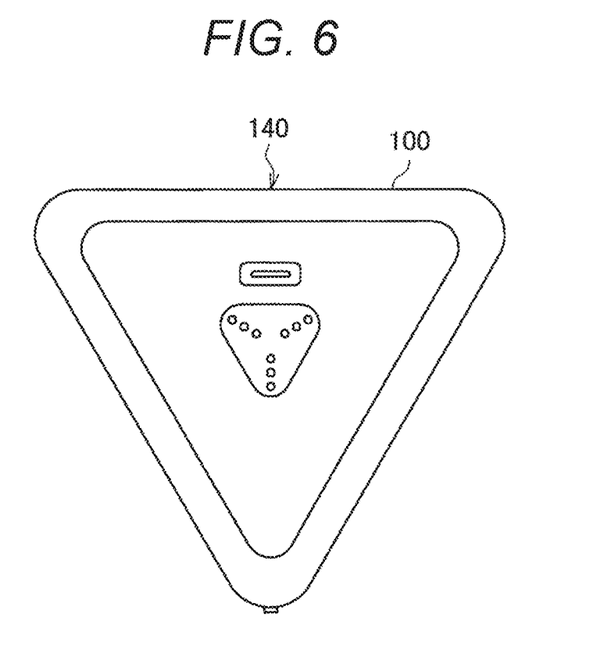
FIG. 6 is an explanatory view illustrating an appearance example of the display device according to the embodiment.

A display device 100 according to the embodiment of the present disclosure is a device having a columnar housing with a substantially equilateral triangular bottom surface, as illustrated in FIGS. 1 to 6. FIG. 1 is a front view of the display device 100 according to the embodiment of the present disclosure. FIG. 2 is a rear view of the display device 100 according to the embodiment of the present disclosure. FIG. 3 is a right side view of the display device 100 according to the embodiment of the present disclosure. FIG. 4 is a left side view of the display device 100 according to the embodiment of the present disclosure. FIG. 5 is a plan view of the display device 100 according to the embodiment of the present disclosure. FIG. 6 is a bottom view of the display device 100 according to the embodiment of the present disclosure.

The display device 100 according to the embodiment of the present disclosure includes a display unit 140 on a front. The display unit 140 is configured by a thin display device such as a liquid crystal display, for example, and is a device capable of displaying a planar image and a stereoscopic image by a naked eye method.

Furthermore, the display device 100 according to the embodiment of the present disclosure includes a sensor unit 130 on the front. The sensor unit 130 is provided to detect a situation of a user who is viewing content displayed on the display unit 140. In the present embodiment, the sensor unit 130 includes an image sensor for detecting the situation of the user from a captured image and a time of flight (ToF) sensor for detecting a distance from the sensor unit 130 to the user. The display device 100 according to the embodiment of the present disclosure can select a planar image or a stereoscopic image as an image to be displayed on the display unit 140 on the basis of a result of sensing by the sensor unit 130.

Figure 7:
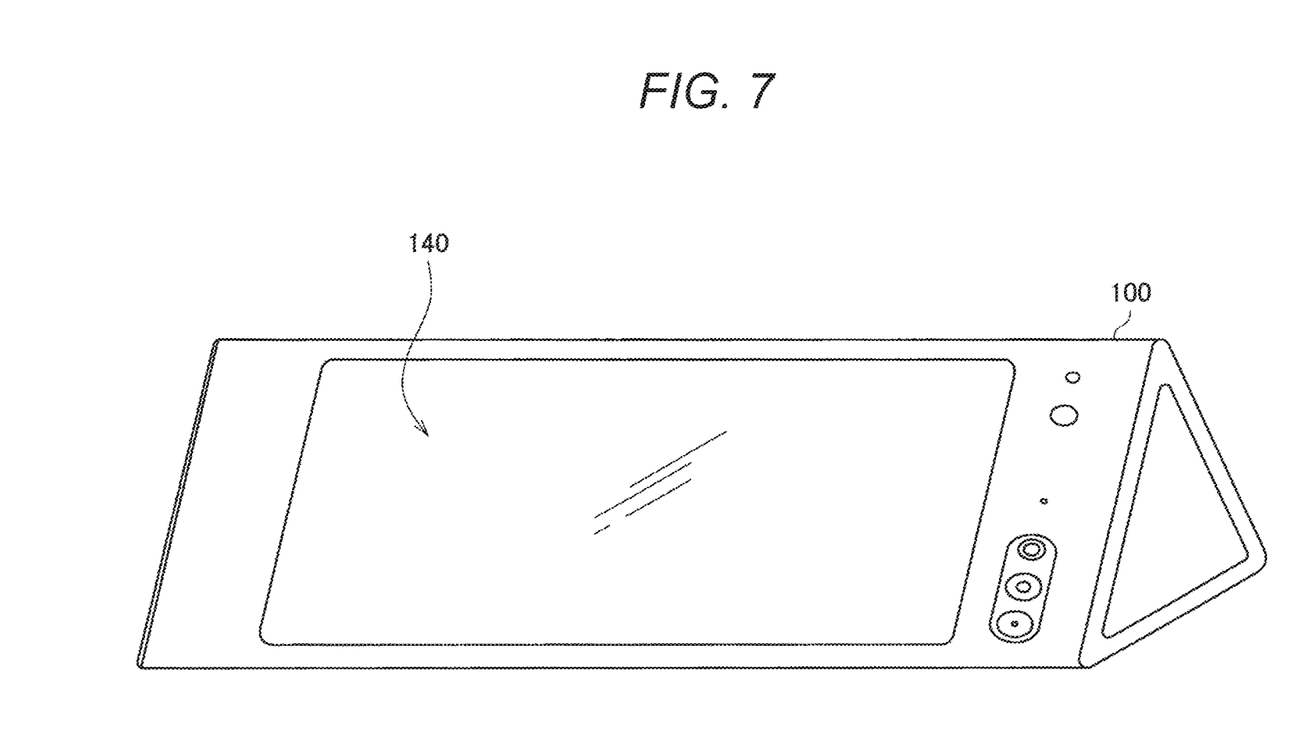
FIG. 7 is an explanatory view illustrating a state in which the display device according to the embodiment is placed in landscape orientation.

The display device 100 according to the embodiment of the present disclosure has the columnar housing with a substantially equilateral triangular bottom surface. Therefore, the display device 100 alone can allow the user to easily view the content in landscape orientation. FIG. 7 is an explanatory view illustrating a state in which the display device 100 according to the embodiment of the present disclosure is placed in landscape orientation.

Figure 8:
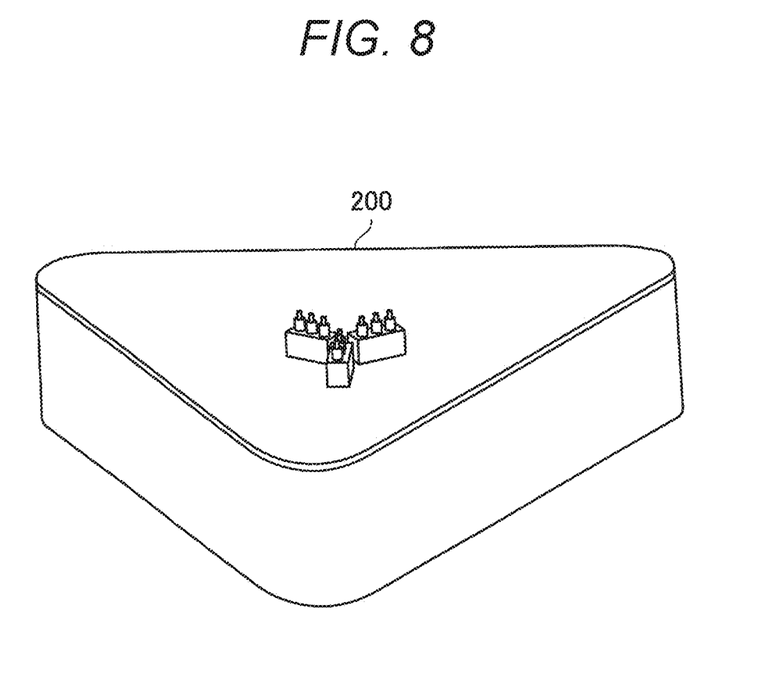
FIG. 8 is an explanatory view illustrating an appearance example of a cradle according to the embodiment.

The display device 100 according to the embodiment of the present disclosure can have a cradle connected to the bottom surface. FIG. 8 is an explanatory view illustrating an appearance example of a cradle 200 according to the embodiment of the present disclosure.

The cradle 200 has a columnar housing with a substantially equilateral triangular bottom surface, similarly to the bottom surface of the display device 100.

Figure 9:
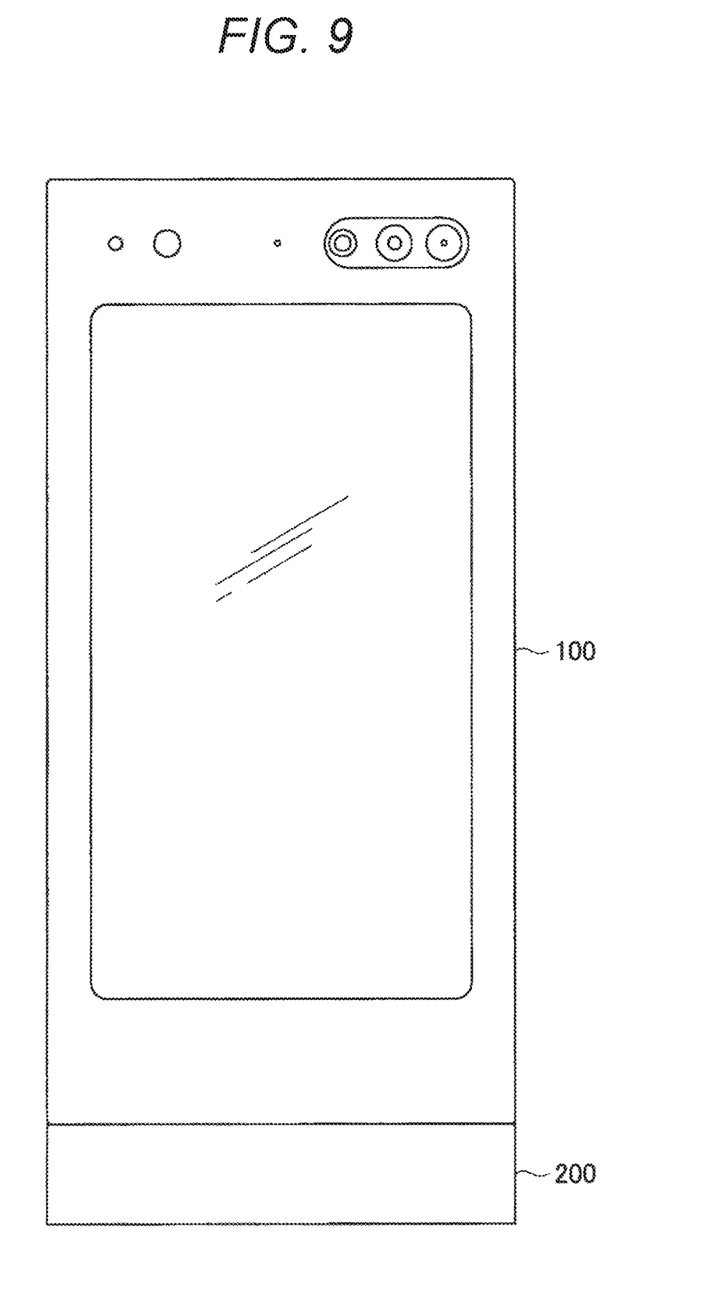
FIG. 9 is an explanatory view illustrating a state in which the display device according to the embodiment is installed on the cradle.

FIG. 9 is an explanatory view illustrating a state in which the display device 100 is installed on the cradle 200. As illustrated in FIG. 9, the display device 100 can receive supply of power from the cradle 200 by being installed on the cradle 200. Furthermore, the cradle 200 is configured to rotate the display device 100 around a longitudinal direction of the display device 100 as an axis. The rotation of the display device 100 may be performed by a user's hand or may be performed by the display device 100 driving the cradle 200.

The appearance example of the display device 100 according to the embodiment of the present disclosure has been described. Next, a functional configuration example of the display device 100 according to the embodiment of the present disclosure will be described.

1.2. Configuration Example of Display Device

Figure 10:
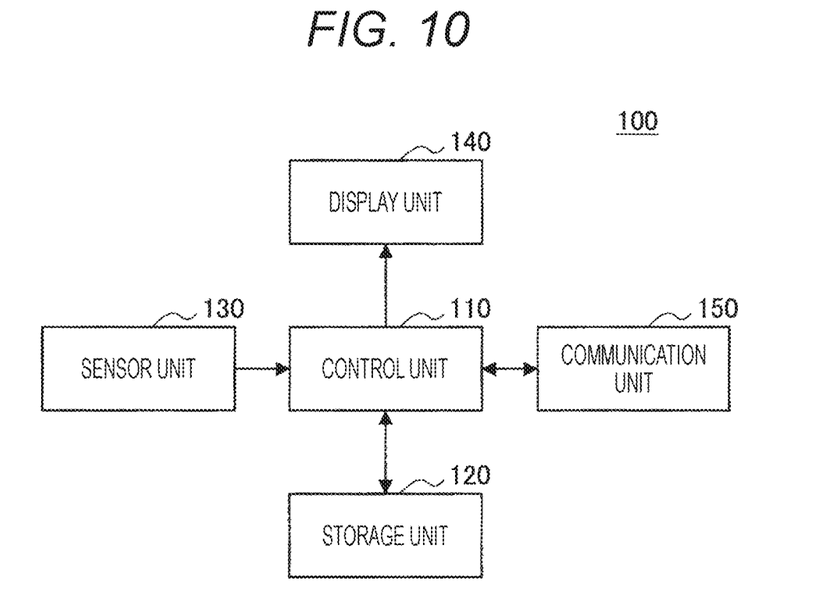
FIG. 10 is an explanatory diagram illustrating a functional configuration example of the display device according to the embodiment.

FIG. 10 is an explanatory diagram illustrating a functional configuration example of the display device 100 according to the embodiment of the present disclosure. Hereinafter, a functional configuration example of the display device 100 according to the embodiment of the present disclosure will be described with reference to FIG. 10.

As illustrated in FIG. 10, the display device 100 according to the embodiment of the present disclosure includes a control unit 110, a storage unit 120, the sensor unit 130, the display unit 140, and a communication unit 150.

The control unit 110 is configured by, for example, a processor such as a central processing unit (CPU) and controls the operation of each unit of the display device 100. In the present embodiment, the control unit 110 selects a planar image or a stereoscopic image as an image to be displayed on the display unit 140 on the basis of the situation of the user of the display device 100, the situation having been sensed by the sensor unit 130. Then, the control unit 110 executes processing of displaying the image on the display unit 140 on the basis of a selection result of the image to be displayed on the display unit 140. That is, when selecting the planar image as the image to be displayed on the display unit 140, the control unit 110 executes normal display processing. When selecting the stereoscopic image as the image to be displayed on the display unit 140, the control unit 110 executes display processing of displaying the image as the stereoscopic image by a naked eye method.

The control unit 110 selects the stereoscopic image as the image to be displayed on the display unit 140 when the control unit 110 finds that the line-of-sight of the user of the display device 100 faces the display unit 140, the user is viewing the content displayed on the display unit 140, and the user is present in a visually recognizable range of the stereoscopic image, for example. Meanwhile, the control unit 110 selects the planar image as the image to be displayed on the display unit 140 when the control unit 110 finds that the line-of-sight of the user of the display device 100 faces the display unit 140 and the user is viewing the content displayed on the display unit 140, but the user is present outside the visually recognizable range of the stereoscopic image. When the control unit 110 finds that a plurality of users is viewing the content displayed on the display unit 140, for example, the control unit 110 selects the planar image as the image to be displayed on the display unit 140.

The storage unit 120 is configured by a storage device such as a read only memory (ROM) and various random access memories (RAMs), for example, and stores programs and various settings for operating the display device 100, content to be displayed on the display unit 140, and the like. The content stored in the storage unit 120 may include content displayed as a stereoscopic image on the display unit 140.

The sensor unit 130 includes an image sensor for detecting the situation of the user from a captured image and a time of flight (ToF) sensor for detecting a distance from the sensor unit 130 to the user, as described above. The sensor unit 130 provides data obtained by the sensing to the control unit 110.

The display unit 140 is configured by a thin display device such as a liquid crystal display, for example, and is a device capable of displaying a planar image and a stereoscopic image by a naked eye method, as described above. Display of an image on the display unit 140 is controlled by the control unit 110.

When selecting the planar image as the image to be displayed on the display unit 140 on the basis of the situation of the user of the display device 100, the situation having been sensed by the sensor unit 130, for example, the display unit 140 displays the planar image under the control of the control unit 110. Meanwhile, when selecting the stereoscopic image as the image to be displayed on the display unit 140 on the basis of the situation of the user of the display device 100, the situation having been sensed by the sensor unit 130, the display unit 140 displays the stereoscopic image under the control of the control unit 110.

The communication unit 150 performs communication with an external device. The communication unit 150 may include an interface for wired communication and an interface for wireless communication.

The functional configuration example of the display device 100 according to the embodiment of the present disclosure has been described. Next, an operation example of the display device 100 according to the embodiment of the present disclosure will be described.

1.3. Operation Example of Display Device

Figure 11:
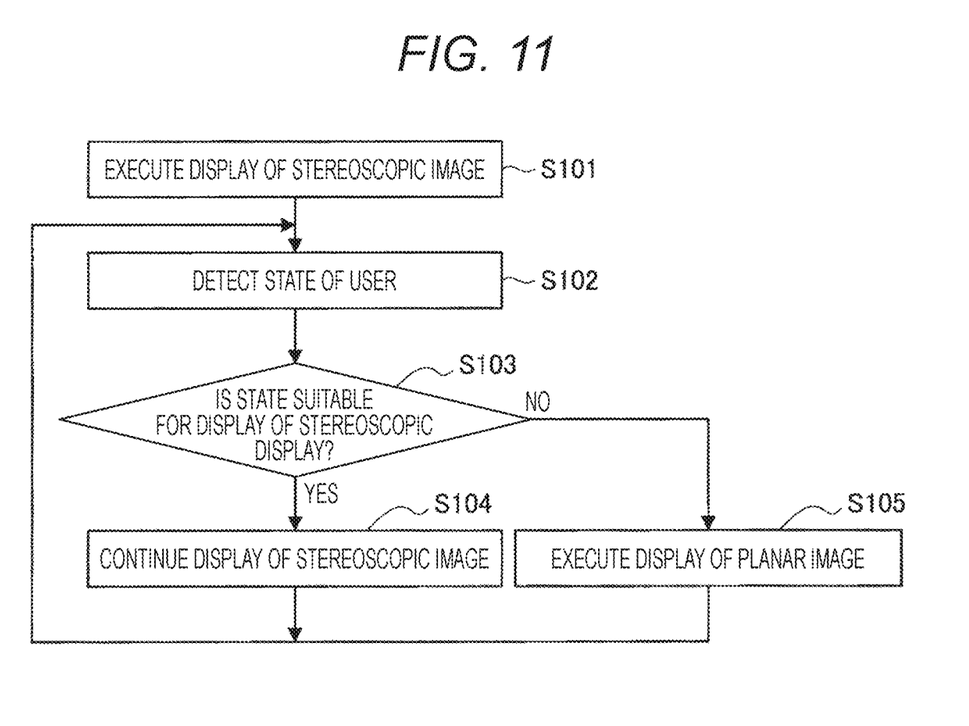
FIG. 11 is a flowchart illustrating an operation example of the display device according to the embodiment.

FIG. 11 is a flowchart illustrating an operation example of the display device 100 according to the embodiment of the present disclosure. FIG. 11 illustrates an operation example of the display device 100 at the time when content for displaying a stereoscopic image is reproduced and the stereoscopic image is displayed on the display unit 140. Hereinafter, an operation example of the display device 100 according to the embodiment of the present disclosure will be described with reference to FIG. 11.

The display device 100 executes display of a stereoscopic image on the display unit 140 by, for example, a user operation (step S101). In this state, the display device 100 detects a state of the user with the sensor unit 130 on a steady basis (step S102). Example of the state of the user may include the distance from the sensor unit 130 to the user, the number of users in the visually recognizable range of the stereoscopic image, movement of the face of the user who is viewing the stereoscopic image, such as movement of the line-of-sight or a frequency of blinking, for example.

Next, the display device 100 determines whether or not the current state of the user is a state suitable for displaying the stereoscopic image, using content of the sensing by the sensor unit 130 (step S103). The determination processing in step S103 is executed by, for example, the control unit 110. The state of the user being a state suitable for displaying the stereoscopic image means that, for example, the user is present in the visually recognizable range of the stereoscopic image, the line-of-sight of the user faces the display unit 140, the number of users in the visually recognizable range of the stereoscopic image is only one, the frequency of blinking of the user who is visually recognizing the stereoscopic image is less than a predetermined number per unit time, or the like.

When the display device 100 determines that the current state of the user is the state suitable for displaying the stereoscopic image as a result of the determination processing in step S103 (step S103, Yes), the display device 100 continues to display the stereoscopic image on the display unit 140. On the other hand, when the display device 100 determines that the current state of the user is not the state suitable for displaying the stereoscopic image as a result of the determination processing in step S103 (step S103, No), the display device 100 switches the image to be displayed on the display unit 140 from the stereoscopic image to a planar image and executes display of the planar image on the display unit 140 (step S105).

Then, the display device 100 returns to the processing of detecting the state of the user in step S102 and thereafter continues the series of processing while the display device 100 reproduces the content of displaying the stereoscopic image.

The display device 100 according to the embodiment of the present disclosure performs the above-described series of processing, thereby automatically switching display of a stereoscopic image and display of a planar image according to the situation of the user obtained as a result of sensing by the sensor unit 130.

In the above-described series of processing, the image to be displayed on the display unit 140 has been switched from the stereoscopic image to the planar image in a case where the state of the user is not the state suitable for displaying the stereoscopic image. However, the present disclosure is not limited to the example.

For example, in a case where the user is not in the visually recognizable range of the stereoscopic image, the display device 100 placed on the cradle 200 may drive the cradle 200 to change the orientation of the display device 100 so that the user is in the visually recognizable range of the stereoscopic image.

Figure 12:
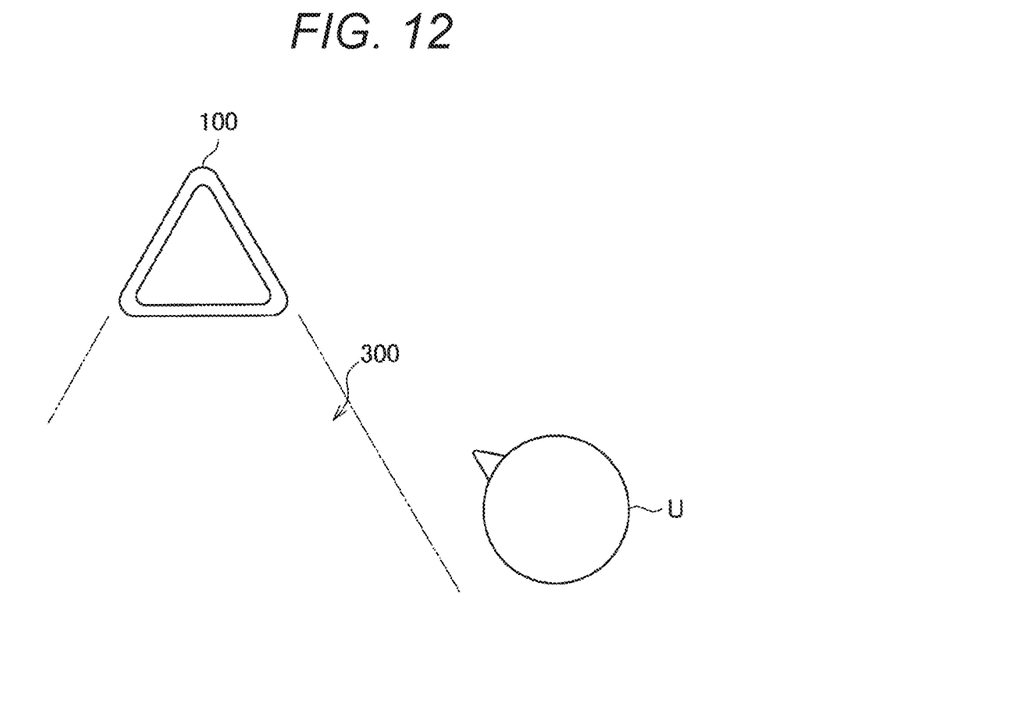
FIG. 12 is an explanatory diagram illustrating a state of the cradle driven by the display device according to the embodiment.
Figure 13:
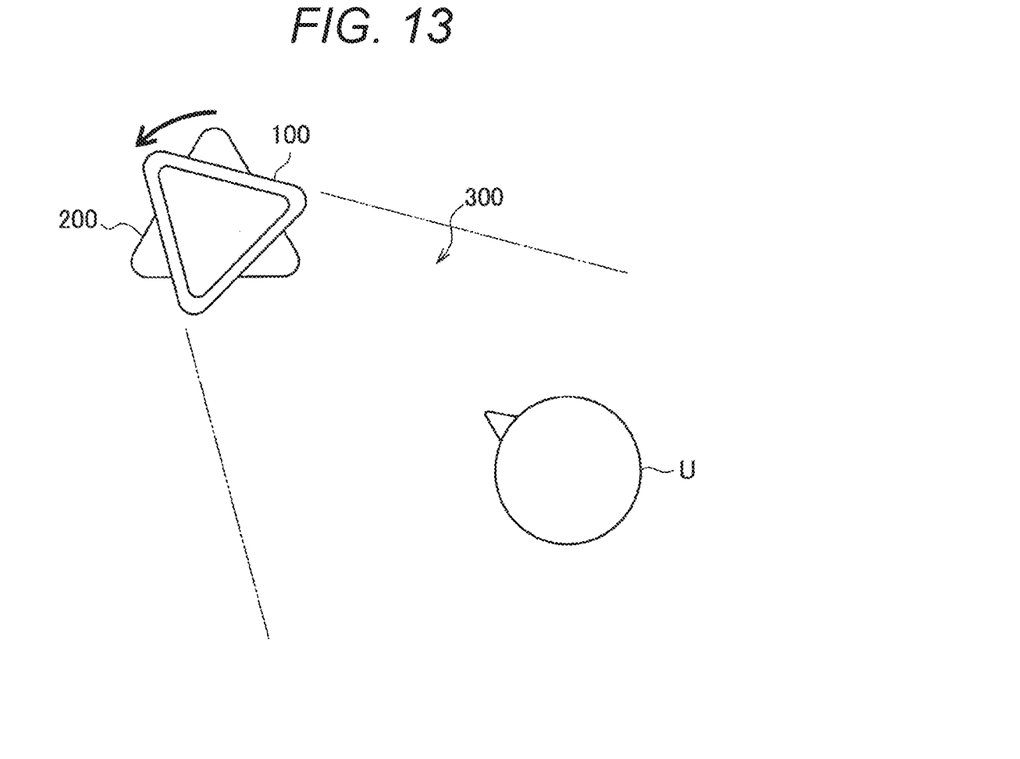
FIG. 13 is an explanatory diagram illustrating a state of the cradle driven by the display device according to the embodiment.

FIGS. 12 and 13 are explanatory diagrams illustrating states of the cradle 200 driven by the display device 100 according to the embodiment of the present disclosure. For example, as illustrated in FIG. 12, it is assumed that a user U is found outside a visually recognizable range 300 of the stereoscopic image by the sensing of the sensor unit 130. In this case, the display device 100 drives the cradle 200 to change the orientation of the display device 100 so that the user U is present in the visually recognizable range 300 of the stereoscopic image, as illustrated in FIG. 13. Thereby, the display device 100 enables the user to visually recognize the stereoscopic image without depending on the user's operation.

Figure 14:
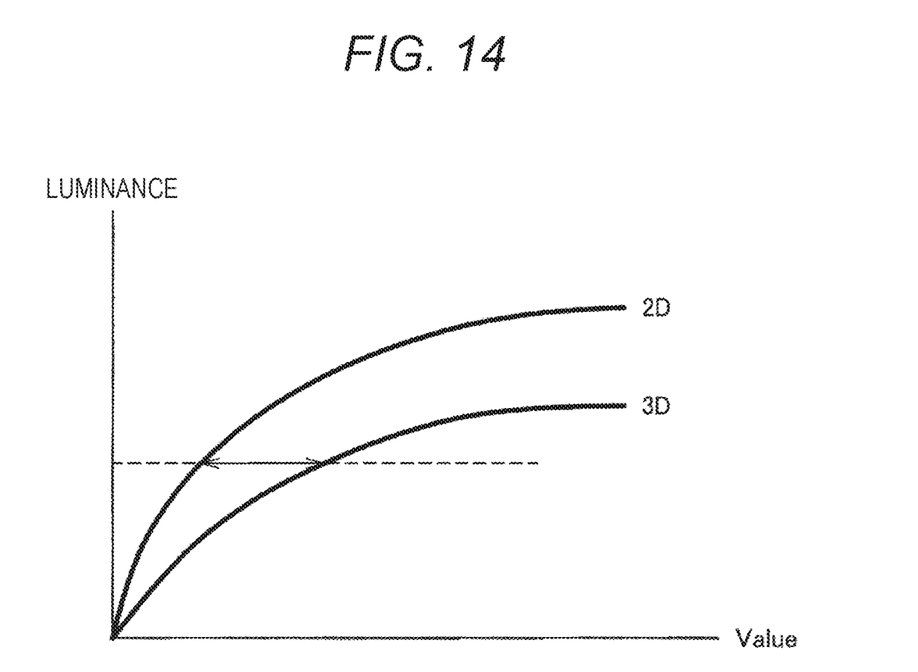
FIG. 14 is an explanatory diagram illustrating as a graph an example of a correspondence between a luminance setting value and actual luminance in a planar image (2D) and a stereoscopic image (3D).

In a case of displaying the planar image and the stereoscopic image using the same luminance setting value, luminance of an actually displayed image is brighter in the planar image than the stereoscopic image. FIG. 14 is an explanatory diagram illustrating as a graph an example of a correspondence between a luminance setting value and actual luminance in a planar image (2D) and a stereoscopic image (3D). Occurrence of the difference in luminance between the display of the planar image and the display of the stereoscopic image is due to characteristic reasons that directivity is imparted to light in displaying the stereoscopic image. Therefore, when the display is switched from the planar image to the stereoscopic image or when the display is switched from the stereoscopic image to the planar image, the luminance of the image changes, which brings a feeling of strangeness to the user.

Therefore, the display device 100 according to the embodiment of the present disclosure may adjust the luminance such that a rapid change in luminance of an image is suppressed, using information of the luminance curves as illustrated in FIG. 14, when switching the display of the planar image and the display of the stereoscopic image. That is, the display device 100 according to the embodiment of the present disclosure may adjust the luminance so that the luminance of an image gradually changes when switching the display of the planar image and the display of the stereoscopic image. By adjusting the luminance when switching the display of the planar image and the display of the stereoscopic image as described above, the display device 100 according to the embodiment of the present disclosure can avoid bringing a feeling of strangeness due to the change in luminance of an image to the user.

As described above, the display device 100 according to the embodiment of the present disclosure can switch the display of the planar image and the display of the stereoscopic image according to the detected state of the user without depending on the user's operation when reproducing content including the stereoscopic image. However, when the display of the planar image and the display of the stereoscopic image are automatically switched as described above, there is a concern that the user may have a doubt about the display of the planar image although the user wants to see the stereoscopic image.

Therefore, the display device 100 according to the embodiment of the present disclosure may display information regarding the reason for switching the display to the planar image on the display unit 140 when having switched the display of the stereoscopic image to the display of the planar image. For example, in a case where the display has been switched to the planar image due to the user being outside the visually recognizable range of the stereoscopic image by the display unit 140, the display device 100 may display an icon or the like notifying the reason on the display unit 140. Furthermore, for example, in a case where the display has been switched to the planar image due to a plurality of users viewing the content displayed on the display unit 140, the display device 100 may display another icon or the like notifying the reason on the display unit 140.

As described above, by displaying information regarding the reason for switching the display to the planar image on the display unit 140, the display device 100 according to the embodiment of the present disclosure can avoid causing the user to have a doubt about display of the planar image although the user wants to see the stereoscopic image.

2. Conclusion

As described above, according to the embodiment of the present disclosure, provided is the display device 100 capable of switching the display of the planar image and the display of the stereoscopic image according to the detected state of the user without depending on the user's operation when reproducing content including the stereoscopic image. As described above, by switching the display of the planar image and the display of the stereoscopic image according to the state of the user, the display device 100 according to the embodiment of the present disclosure can display the stereoscopic image in a case where the user can normally visually recognize the stereoscopic image and can display the planar image in a case where the user cannot normally visually recognize the stereoscopic image. By displaying the planar image or the stereoscopic image as described above, the display device 100 according to the embodiment of the present disclosure can avoid causing the user to feel stress when the user views the content.

The steps in the processing performed by each device in the present specification do not necessarily need be processed chronologically in the order described as the sequence diagram or the flowchart. For example, the steps in the processing executed by each device may be processed in an order different from the order described as the flowchart or may be processed in parallel.

Furthermore, a computer program for causing the hardware such as the CPU, the ROM, and the RAM built in each device to exhibit a function at a similar level to the above-described configuration of each device. Furthermore, a storage medium that has stored the computer program can be provided. Furthermore, by configuring each functional block illustrated in the functional block diagram by hardware, a series of processing can be realized by hardware.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

A display device including:

a display unit capable of displaying a planar image and a stereoscopic image; and a control unit configured to automatically switch an image to be displayed on the display unit to the planar image or the stereoscopic image, using a detected state of a user.

(2)

The display device according to (1), in which the control unit switches the image to be displayed on the display unit to the planar image or the stereoscopic image according to whether or not the user is present in a visually recognizable range of the stereoscopic image by the display unit as the state of the user.

(3)

The display device according to (2), in which the control unit switches the image to be displayed on the display unit to the planar image when a plurality of users is present in the visually recognizable range of the stereoscopic image by the display unit.

(4)

The display device according to (1), in which, in a case where the user is present outside a visually recognizable range of the stereoscopic image by the display unit, the control unit generates a signal for rotationally driving the display device to include the user in the visually recognizable range of the stereoscopic image.

(5)

The display device according to (1), in which the control unit switches the image to be displayed on the display unit from the stereoscopic image to the planar image when a detected frequency of blinking of the user exceeds a predetermined threshold.

(6)

The display device according to any one of (1) to (5), in which the control unit performs control to suppress a rapid change in luminance of the display unit accompanying switching when switching the image to be displayed on the display unit to the planar image or the stereoscopic image.

(7)

The display device according to any one of (1) to (6), in which the control unit generates a signal for displaying information regarding a switching reason on the display unit when switching the image to be displayed on the display unit from the planar image to the stereoscopic image.

(8)

A display method including: by a processor, automatically switching an image to be displayed on a display unit to a planar image or a stereoscopic image, using a detected state of a user, the display unit being capable of displaying the planar image and the stereoscopic image.

(9)

A computer program for causing a computer to execute: automatically switching an image to be displayed on a display unit to a planar image or a stereoscopic image, using a detected state of a user, the display unit being capable of displaying the planar image and the stereoscopic image.

REFERENCE SIGNS LIST

100 Display device
200 Cradle

The invention claimed is:

1. A display device, comprising:
a display configured to display a planar image and a stereoscopic image; and
circuitry configured to
automatically switch an image to be displayed on the display to the planar image or the stereoscopic image, using a detected state of a user,
in response to the user being outside a visually recognizable range of the stereoscopic image, rotationally drive the display device to include the user in the visually recognizable range of the stereoscopic image, and
adjust a luminance of the display in response to automatically switching the display between the display of the planar image and the display of the stereoscopic image, wherein the luminance of the display is adjusted based on luminance curves, wherein the luminance curves include a correspondence between a luminance setting value and actual luminance in a planar image and a stereoscopic image due to characteristic reasons that directivity is imparted to light in displaying the stereoscopic image.

2. The display device according to claim 1, wherein the circuitry is further configured to switch the image to be displayed on the display to the planar image or the stereoscopic image according to whether or not the user is present in a visually recognizable range of the stereoscopic image by the display as the state of the user.

3. The display device according to claim 2, wherein the circuitry is further configured to switch the image to be displayed on the display to the planar image when a plurality of users is present in the visually recognizable range of the stereoscopic image by the display.

4. The display device according to claim 1, wherein the circuitry is further configured switch the image to be displayed on the display from the stereoscopic image to the planar image when a detected frequency of blinking of the user exceeds a predetermined threshold.

5. The display device according to claim 1, wherein the circuitry is further configured to generate a signal for displaying information regarding a switching reason on the display when switching the image to be displayed on the display from the planar image to the stereoscopic image.

6. A display method comprising:
by a processor, automatically switching an image to be displayed on a display to a planar image or a stereoscopic image, using a detected state of a user, the display being capable of displaying the planar image and the stereoscopic image;
in response to the user being outside a visually recognizable range of the stereoscopic image, rotationally driving the display device to include the user in the visually recognizable range of the stereoscopic image; and
adjusting a luminance of the display in response to automatically switching the display between the display of the planar image and the display of the stereoscopic image, wherein the luminance of the display is adjusted based on luminance curves, wherein the luminance curves include a correspondence between a luminance setting value and actual luminance in a planar image and a stereoscopic image due to characteristic reasons that directivity is imparted to light in displaying the stereoscopic image.

7. A non-transitory computer-readable storage medium storing computer-readable instructions thereon which, when executed by a computer, cause the computer to perform a method, the method comprising:
automatically switching an image to be displayed on a display to a planar image or stereoscopic image, using a detected state of a user, the display being capable of displaying the planar image and the stereoscopic image;
in response to the user being outside a visually recognizable range of the stereoscopic image, rotationally driving the display device to include the user in the visually recognizable range of the stereoscopic image; and
adjusting a luminance of the display in response to automatically switching the display between the display of the planar image and the display of the stereoscopic image, wherein the luminance of the display is adjusted based on luminance curves, wherein the luminance curves include a correspondence between a luminance setting value and actual luminance in a planar image and a stereoscopic image due to characteristic reasons that directivity is imparted to light in displaying the stereoscopic image.

* * * * *